US007373551B2

United States Patent
Rothman et al.

(10) Patent No.: US 7,373,551 B2
(45) Date of Patent: May 13, 2008

(54) METHOD TO PROVIDE AUTONOMIC BOOT RECOVERY

(75) Inventors: Michael A. Rothman, Puyallup, WA (US); Andrew J. Fish, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 11/019,604

(22) Filed: Dec. 21, 2004

(65) Prior Publication Data

US 2006/0143431 A1 Jun. 29, 2006

(51) Int. Cl.
*G06F 11/00* (2006.01)
(52) U.S. Cl. .......................................... 714/30; 714/36
(58) Field of Classification Search .................. 714/36, 714/2, 11–13
See application file for complete search history.

(56) References Cited

U.S. PATENT DOCUMENTS

| | | | |
|---|---|---|---|
| 6,665,813 B1 * | 12/2003 | Forsman et al. ............... | 714/15 |
| 6,754,828 B1 * | 6/2004 | Marisetty et al. ............... | 726/2 |
| 7,117,385 B2 * | 10/2006 | Chokshi et al. ................ | 714/5 |
| 2005/0228888 A1 * | 10/2005 | Mihm et al. ................ | 709/227 |
| 2006/0090064 A1 * | 4/2006 | Michaelis et al. .......... | 713/100 |
| 2006/0107112 A1 * | 5/2006 | Michaelis et al. ............ | 714/15 |
| 2006/0107114 A1 * | 5/2006 | Michaelis et al. ............ | 714/25 |

\* cited by examiner

*Primary Examiner*—Dieu-Minh Le
(74) *Attorney, Agent, or Firm*—Joni D. Stutman-Horn (57) ABSTRACT

In some embodiments, the invention involves a system and method relating to autonomic boot recovery. In at least one embodiment, the present invention utilizes an out-of-band (OOB) microcontroller to safeguard boot information to be used in the event of a boot failure. The OOB microcontroller enables the preservation of "Last Known Good" boot configurations as well as providing an agent to provide self-healing to a platform which might have run into some type of corruption of critical data. In some embodiments a variety of intelligent filter mechanisms are enabled to allow a user to target the preservation of only certain types of configuration data. Other embodiments are described and claimed.

20 Claims, 4 Drawing Sheets

METHOD TO PROVIDE AUTONOMIC BOOT RECOVERY

FIELD OF THE INVENTION

An embodiment of the present invention relates generally to start up of computing devices and, more specifically, to autonomic boot recovery using a protected non-volatile store inaccessible to the boot firmware to maintain last known good boot information.

BACKGROUND INFORMATION

Various mechanisms exist for recovering a platform from a bad boot. Often re-booting the platform is the first method attempted by the platform for recovery. Boot sector viruses attempt to infect the boot sector of the firmware, resulting in the operating system (OS) not being able to launch properly. Malicious, as well as inadvertent, actions may prevent the OS from loading properly. If the boot sector has been damaged, either by accident, or by malicious code, human operator intervention is often required to boot the platform. Some systems without directly connected media will boot from a remote boot device. The boot vector, or pointer to the remote location, resides in non-volatile memory within the boot sector. If a system is without media, then the pointer to the remote boot device typically cannot be altered without removing the boot sector firmware and either rewriting or replacing it. If the boot vector is tampered with, then the platform cannot boot properly.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to autonomic boot recovery. In at least one embodiment, the present invention utilizes an out-of-band (OOB) microcontroller (also referred to as "OOB µcontroller") to safeguard boot information to be used in the event of a boot failure. The OOB µcontroller enables the preservation of "Last Known Good" boot configurations as well as providing an agent to provide self-healing to a platform which might have run into some type of corruption of critical data. In some embodiments, the present system and method enable a variety of intelligent filter mechanisms to allow a user to target the preservation of only certain types of configuration data. Embodiments may apply to existing platforms by using a private non-volatile (NV) store. Some embodiments may apply to platforms having built in hardware OOB capabilities, such as the planned chipset (ICH7) to be available from Intel Corporation. Embodiments may apply to platforms having a locked NV store which may contain qualified backup boot data and have recovery policies which may be enacted by an OOB µcontroller in the platform. Embodiments of the present invention are discussed below with reference to a platform having specific out-of-band capabilities. It will be apparent to one of ordinary skill in the art that other implementations are possible using platforms without this capability, and the discussion is not meant to be limiting to this embodiment.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
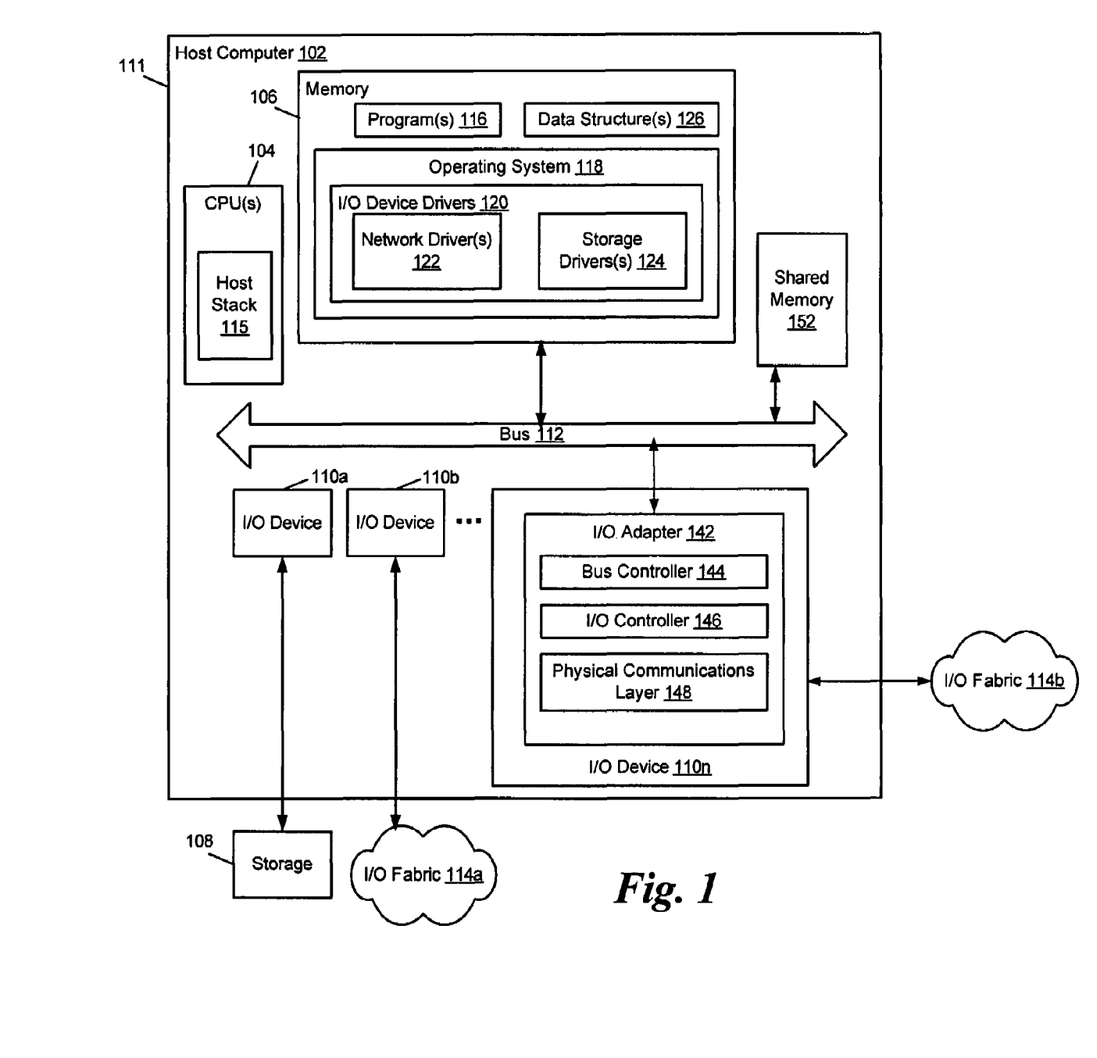
FIG. 1 illustrates an embodiment of a computing environment in which the present invention may be implemented.

FIG. 1 is a block diagram illustrating a computing environment in which aspects of described embodiments may be employed. A host computer 102 includes one or more system processors or central processing units (CPUs) 104, a volatile memory 106 and an I/O device 108 which is, in an embodiment, a non-volatile storage 108 (e.g., magnetic disk drives, optical disk drives, a tape drive, etc.). The host computer 102 is coupled to one or more I/O devices 110a, 110b, ... 110n via one or more buses such as a local bus 112, which is maintained on a board supported on a local chassis 111. In the illustrated embodiment, the I/O device 110a is a storage controller, the I/O device 110b is a network controller and the I/O device 110n is depicted as an out-of band microcontroller (herein referred to as "OOB µcontroller"). Any number of I/O devices 110a, 110b, ... 110n including video controllers, port adapters etc. may be attached to the local bus 112 of the host computer 102.

The host computer 102 uses I/O devices in performing I/O operations (e.g., network I/O operations, storage I/O operations, etc.). Thus, the I/O device 110a may be used as a storage controller for storage such as the storage 108, for example, which may be directly connected to the host computer 102 or may be connected by a network.

An I/O device such as a storage controller controls the reading of data from and the writing of data to the storage 108 in accordance with a storage protocol layer. The storage protocol may be any of a number of suitable storage protocols including Redundant Array of Independent Disks (RAID), High Speed Serialized Advanced Technology Attachment (SATA), parallel Small Computer System Interface (SCSI), serial attached SCSI, etc. Data being written to or read from the storage 108 may be cached in a cache in accordance with suitable caching techniques. The storage controller may be integrated into the CPU chipset, which can include various controllers including a system controller, peripheral controller, memory controller, hub controller, I/O bus controller, etc.

A host stack 115 may execute on at least one CPU 104. A host stack may be described as software that includes programs, libraries, drivers, and an operating system that run on host processors (e.g., CPU 104) of a host computer 102.

One or more programs 116 (e.g., host software, application programs, and/or other programs) and an operating system 118 reside in memory 106 during execution and execute on one or more CPUs 104.

The host computer 102 may comprise any suitable computing device, such as a mainframe, server, personal computer, workstation, laptop, handheld computer, telephony device, network appliance, virtualization device, storage controller, etc. Any suitable CPU 104 and operating system 118 may be used. Programs and data in memory 106 may be swapped between memory 106 and storage 108 as part of memory management operations.

Operating system 118 includes I/O device drivers 120. The I/O device drivers 120 include one or more network drivers 122 and one or more storage drivers 124 that reside in memory 106 during execution. The network drivers 122 and storage drivers 124 may be described as types of I/O device drivers 120. The I/O drivers 120 may also include drivers for one or more remote I/O devices (not shown). Also, one or more data structures 126 are in memory 106.

Each I/O device driver 120 includes I/O device specific commands to communicate with an associated I/O device 110a . . . 110n, and interfaces between the operating system 118, programs 116 and the associated I/O device 110a, 110b, . . . 110n. The I/O devices 110a, 110b, . . . 110n, and I/O device drivers 120 employ logic to process I/O functions.

Each I/O device 110a, 110b, . . . 110n includes various components implemented in the hardware of the I/O device 110a, 110b, . . . 110n; The I/O devices 110b, . . . 110n of the illustrated embodiment may each be capable of transmitting and receiving data over an I/O fabric 114a, 114b. The I/O fabrics 114a, 114b may be the same or different, or separate or combined. Each I/O fabric 114a, 114b may comprise a Local Area Network (LAN), the Internet, a Wide Area Network (WAN), a Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc. I/O fabric 114b is typically an out-of-band connection used solely by the out-of-band µcontroller 110n. I/O fabric 114a is typically accessible via a network interface card operatively coupled to the processor 104.

Each I/O device 110a, 110b . . . 110n may include an I/O adapter 142, which in certain embodiments, is a Host Bus Adapter (HBA). In the illustrated embodiment, an I/O adapter 142 includes a bus controller 144, an I/O controller 146, and a physical communications layer 148. The bus controller 144 enables the I/O device 110a, 110b . . . 110n to communicate on a bus 112 which may comprise any suitable bus interface, such as any type of Peripheral Component Interconnect (PCI) bus (e.g., a PCI bus (PCI Special Interest Group, PCI Local Bus Specification, Rev 2.3, published Mar. 15, 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc or another type of peripheral bus.

The I/O controller 146 provides functions used to perform I/O functions. The physical communication layer 148 provides functionality to send and receive information over a network, or directly to and from an I/O device such as a storage device, a display, a printer, a keyboard, mouse etc.

In the illustrated embodiment, the physical communication layer 148 of the network controller 110b and the OOB µcontroller 110n send and receive network packets to and from remote devices or computer systems over an I/O fabric 114a, 114b. When booting from a network target I/O device 110b will typically communicate with the target to receive boot instructions. In certain embodiments, the I/O controller 146 may implement the Ethernet protocol (IEEE std. 802.3, published Mar. 8, 2002) over unshielded twisted pair cable, TCP/IP (Transmission Control Protocol/Internet Protocol), Remote Direct Memory Access (RDMA), token ring protocol, Fibre Channel (IETF RFC 3643, published December 2003), Infiniband, or any other suitable networking protocol. Details on the TCP protocol are described in "Internet Engineering Task Force (IETF) Request for Comments (RFC) 793," published September 1981, details on the IP protocol are described in "Internet Engineering Task Force (IETF) Request for Comments (RFC) 791, published September 1981, and details on the RDMA protocol are described in the technology specification "Architectural Specifications for RDMA over TCP/IP" Version 1.0 (October 2003).

The I/O device 110n may be integrated into the CPU chipset, which can include various controllers including a system controller, peripheral controller, memory controller, hub controller, I/O bus controller, etc. Alternatively, the OOB µcontroller 110n may comprise separate integrated circuits disposed on an expansion board which is connected to the local bus 112 in an expansion slot.

The I/O devices 110a, 110b . . . 110n may include additional hardware logic to perform additional operations. For example, the I/O controller 146 of the devices 110b, 110n of the illustrated embodiment may each include a network protocol layer to send and receive network packets to and from remote devices over the I/O fabric 114a, 114b. The I/O device 110b, 110n can control other protocol layers including a data link layer and the physical layer 148 which includes hardware such as a data transceiver.

Operations of the OOB µcontroller 110n and the CPU 104 facilitate communication between the OOB µcontroller 110n and the CPU 104 independent of the state of the CPU 104. In an embodiment, messages containing directives to the host computer 102 may be posted by the OOB µcontroller 110n for a number of activities such as firmware updates, operating system updates, driver updates, retrieval of information such as software version data, etc. Directives may be forwarded from external sources (not shown) such as servers, peer-to-peer communications, administrator workstations, etc. Information retrieved in response to directives may be obtained from a variety of sources including firmware, operating systems, drivers, applications, etc., and forwarded to external targets or sources.

In an embodiment, implementation of "mailboxes" to pass messages and data between the in-band and out-of-band processor is according to techniques discussed in U.S. patent application Ser. No. 10/964,355, entitled "BUS COMMUNICATION EMULATION" to Rothman et al. and filed on Oct. 12, 2004.

The OOB µcontroller 110n may be operated to store a "message" containing a directive in a memory shared by the OOB µcontroller 110n and a processor of the computer system such as the CPU 104 of the host computer 102. In the illustrated embodiment, the host computer 102 includes a shared memory 152 which is accessible by both the CPU 104 and the OOB µcontroller 110n. The shared memory 152 may reside in a reserved area of RAM 152a (FIG. 2), or be located in a separate non-volatile memory store 152b (FIG.

2), or the like. The shared memory may be operated as a mailbox for these messages. Thus, in one aspect, the OOB μcontroller 110n may store a message in the shared memory 152 or retrieve a message from the shared memory 152, independently of the status of the host computer 102 including the status of the CPU 104, the operating system 118 and the programs 116. Thus, in the illustrated embodiment, the OOB μcontroller 110n may store or retrieve messages in the shared memory 152 whether the CPU 104 is being initialized or is turned off, or whether the operating system 118 is booting, running, crashed or otherwise.

To facilitate such independent operation, in this example, the controller 110n, the shared memory 152, the local bus 112 and other components as appropriate may be powered independently (FIG. 2, 225) of the main components of the host computer 102 including the CPU 104 and the host memory 106. The shared memory 152 may be non-volatile (NV) memory such as flash memory or static random access memory (SRAM). In embodiments described in more detail below, the OOB μcontroller 110n operates independently of the operating system 118 or system start-up program, such that the OOB μcontroller 110n may have its own dedicated control circuitry, firmware, operating system, etc. to control the operations of the OOB μcontroller 110n independently of the status of the remainder of the host computer 102. It is appreciated that the degree of operational independence, if any, of the controller 110n and other components may vary, depending upon the particular application.

In the illustrated embodiment, the shared memory 152 may be a persistent, reserved portion of the storage 108 or a separate non-volatile memory. Accordingly, the memory safety of the operating system 118 can be maintained. For example, the OOB μcontroller 110n may avoid direct memory access operations into the main host memory 106.

A message intended for the CPU 104 may be marked to be read and processed by the CPU 104. The marking may occur before, during or after the message is actually stored in the shared memory 152.

The CPU 104, when operational, may read the message stored in the shared memory 152 and marked as intended for the CPU 104, and process any directive contained within the message. As previously mentioned, the directive may direct the CPU 104 to undertake any of a number of activities including updating firmware, drivers, operating system, or applications, applying patches, applying interrupts, retrieving information, etc.

Conversely, a system processor such as the CPU 104 of the host computer 102 may store a message in the shared memory 152. The storing of a message by the system processor may be in response to a directive contained in a message from the OOB μcontroller 110n, which was read from the shared memory 152 and processed by the CPU 104. The directive from the controller may have included instructions to retrieve certain information such as, for example, data describing the version of an application 116 of the host computer 102. This information may be packaged into a message which is stored by the CPU 104 into the shared memory 152.

A message intended for the controller 110n may be marked to be read and processed by the controller 110n. The marking may occur before, during or after the message is actually stored in the shared memory 152. A message so marked may be read by the controller 110n from the shared memory 152 and any directive or information contained within the message may be processed. For example, information contained within the message may be forwarded to an external source such as an administrator workstation, a second computer system, a server, or other external source.

Figure 2:
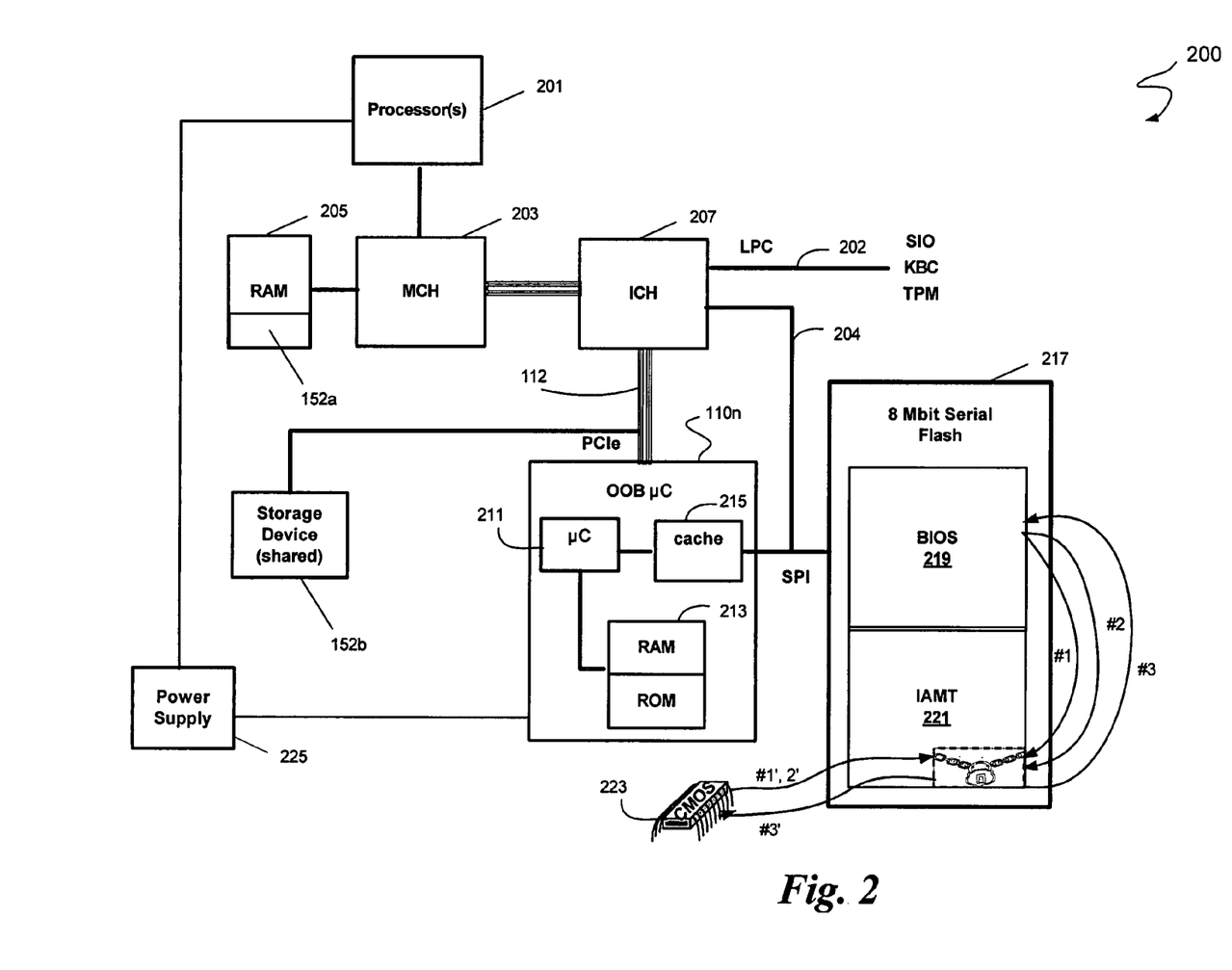
FIG. 2 is a simplified block diagram illustrating features of an out-of-band microcontroller, according to an embodiment of the environment.

FIG. 2 is a block diagram illustrating features of an out-of-band microcontroller (OOB μcontroller), according to an embodiment of the environment. A platform 200 comprises a processor 201. The processor 201 may be connected to random access memory 205 via a memory controller hub 203. Processor 201 may be any type of processor capable of executing software, such as a microprocessor, digital signal processor, microcontroller, or the like. Though FIG. 2 shows only one such processor 201, there may be one or more processors in the platform 200 and one or more of the processors may include multiple threads, multiple cores, or the like.

The processor 201 may be further connected to I/O devices via an input/output controller hub (ICH) 207. The ICH may be coupled to various devices, such as a super I/O controller (SIO), keyboard controller (KBC), or trusted platform module (TPM) via a low pin count (LPC) bus 202. The SIO, for instance, may have access to floppy drives or industry standard architecture (ISA) devices. In an embodiment, the ICH is coupled to non-volatile memory via a serial peripheral interface (SPI) bus 204. The non-volatile memory may be flash memory or static random access memory (SRAM), or the like. An out-of-band (OOB) μcontroller 110n (as in FIG. 1) may be present on the platform 200. The OOB μcontroller 110n may connect to the ICH via a bus 112, typically a peripheral component interconnect (PCI) or PCI express bus. The OOB μcontroller may also be coupled with the non-volatile memory store (NV store) 217 via the SPI bus 204. The NV store 217 may be flash memory or static RAM (SRAM), or the like. In many existing systems, the NV store is flash memory.

The OOB μcontroller 110n may be likened to a "miniature" processor. Like a full capability processor, the OOB μcontroller has a processor unit 211 which may be operatively coupled to a cache memory 215, as well as RAM and ROM memory 213. The OOB μcontroller may have a built-in network interface and independent connection to a power supply 225 to enable out-of-band communication even when the in-band processor 201 is not active.

In embodiments, the processor has a basic input output system (BIOS) 219 in the NV store 217. In other embodiments, the processor boots from a remote device (not shown) and the boot vector (pointer) resides in the BIOS portion 219 of the NV store 217. The OOB μcontroller may have access to all of the contents of the NV store 217, including the BIOS portion 219 and a protected portion 221 of the non-volatile memory. In some embodiments, the protected portion 221 of memory may be secured with Intel Active Management Technology (IAMT). More information about IAMT may be found on the public Internet at URL www-intel-com/technology/manage/iamt/. (Note that periods have been replaced with dashes in URLs contained within this document in order to avoid inadvertent hyperlinks).

Since the BIOS portion of non-volatile memory may be modified by the OS or applications running within the OS, it is vulnerable to malicious tampering. The protected area of memory 221, available only to the OOB μcontroller, may be used to store critical boot vector information without risk of tampering. The only way to access the OOB μcontroller side of the NV store 217 is through verification via a proxy through the OOB μcontroller, i.e., signature authentication or the like.

Many existing systems use the extensible firmware interface (EFI) and its associated flash variables. The EFI is a specification which defines a new model for the interface between operating systems and platform firmware, commonly known as Basic Input Output System (BIOS). The specification version 1.10, published Dec. 1, 2002, is available on the public Internet at URL developer-intel-com/technology/efi/main_specification.htm. In the EFI boot location specification, instead of wholly depending on pointers to a single boot location, a series of boot variables are used. The boot variables specify from which location the platform should boot. EFI systems store the boot variables in non-volatile memory, typically flash memory. This standard architecture is convenient for implementing embodiments of the present invention because the location of the boot variables is well defined.

Using EFI, the platform may have boot variables and a boot order list. For instance, the boot order may dictate that a floppy drive (A:\) is booted from first. The policy may dictate that a hard drive is booted from next, a CD is booted from next, etc. The boot order list may include network targets for boot. In some existing systems, an application may write over a boot variable. Some legacy systems not using the EFI architecture store boot information in CMOS, using proprietary formats. Embodiments of the present invention utilize a hardware protected region 221 of the non-volatile memory 217 and make the protected region inaccessible to the OS. The OOB μcontroller 110n controls this protected portion of the non-volatile memory 217. Thus, the firmware (BIOS) cannot access the protected portion 221. Further, applications running under the OS cannot directly communicate with the OOB μcontroller. Therefore, these applications have no access to the protected portion 221.

The OOB μcontroller can promote certain settings to its own protected NV store 221. In other words, the OOB μcontroller may heuristically select which good boot information to store in case a need should arise to replace the current boot information. The OOB μcontroller may retrieve information from the BIOS side 219 of the non-volatile memory 217. In embodiments, the OOB μcontroller may determine the last known good boot settings and store them in the protected portion 221. In some embodiments, the OOB μcontroller may directly replace the boot settings in the BIOS portion 219 of the NV store 217. Heuristics may be used to identify what the last known good setting is.

For instance, an example heuristic may be that two successful boots with no changes indicates that the settings are known to be "good." In some embodiments, one good boot may be enough. Once a "good" setting is verified, the OOB μcontroller may take a "snapshot" of the good configuration (settings) and store them in the NV store 221 that is unavailable to the boot processor or boot firmware.

FIG. 2 shows arrows enumerated with numbers (#) 1, 2, and 3 to indicate temporal order for activities associated with an embodiment of the invention. Numbers (#) 1', 2', and 3' indicate temporal order for activities associated with an alternative embodiment of the invention having configuration settings in CMOS. After n successful boots, a layered set of last known good settings is established and stored in the IAMT 221 in #1, where n is defined by platform policy. An intelligent filter of data savings may be established and driven by target characteristics, such as, if the target is network media, non-removable, etc., in #2. There may be filter policies that preclude the boot vector from pointing to a network location, but not for a floppy drive, for example. The policy may completely block this request, or send a notification. The OOB μcontroller may reset the boot settings in the BIOS portion 219 of the non-volatile memory 217 from the preserved last known good boot data, in #3.

In some embodiments, a CMOS chip 223 accommodates systems with legacy firmware. In these legacy systems, boot settings may be stored on the CMOS in proprietary formats, rather than in a NV store like flash memory. A snapshot of CMOS settings may be stored in a known location. Some embodiments may have flash memory 217 and CMOS 223. In the case of a system with CMOS, after n successful boots, a layered set of last known good settings is established and retrieved from the CMOS 223. The settings are then stored in the OOB μcontroller protected portion (IAMT) 221 in #1', where n is defined by platform policy. An intelligent filter of data savings may be established and driven by target characteristics, such as, if the target is network media, non-removable, etc., prior to storing the settings in #2'. There may be filter policies that preclude the boot vector from pointing to a network location, but not for a floppy drive, for example. The policy may completely block this request, or send a notification. The OOB μcontroller may reset the boot settings in the CMOS 223 from the preserved last known good boot data, in #3'.

Figure 3A:
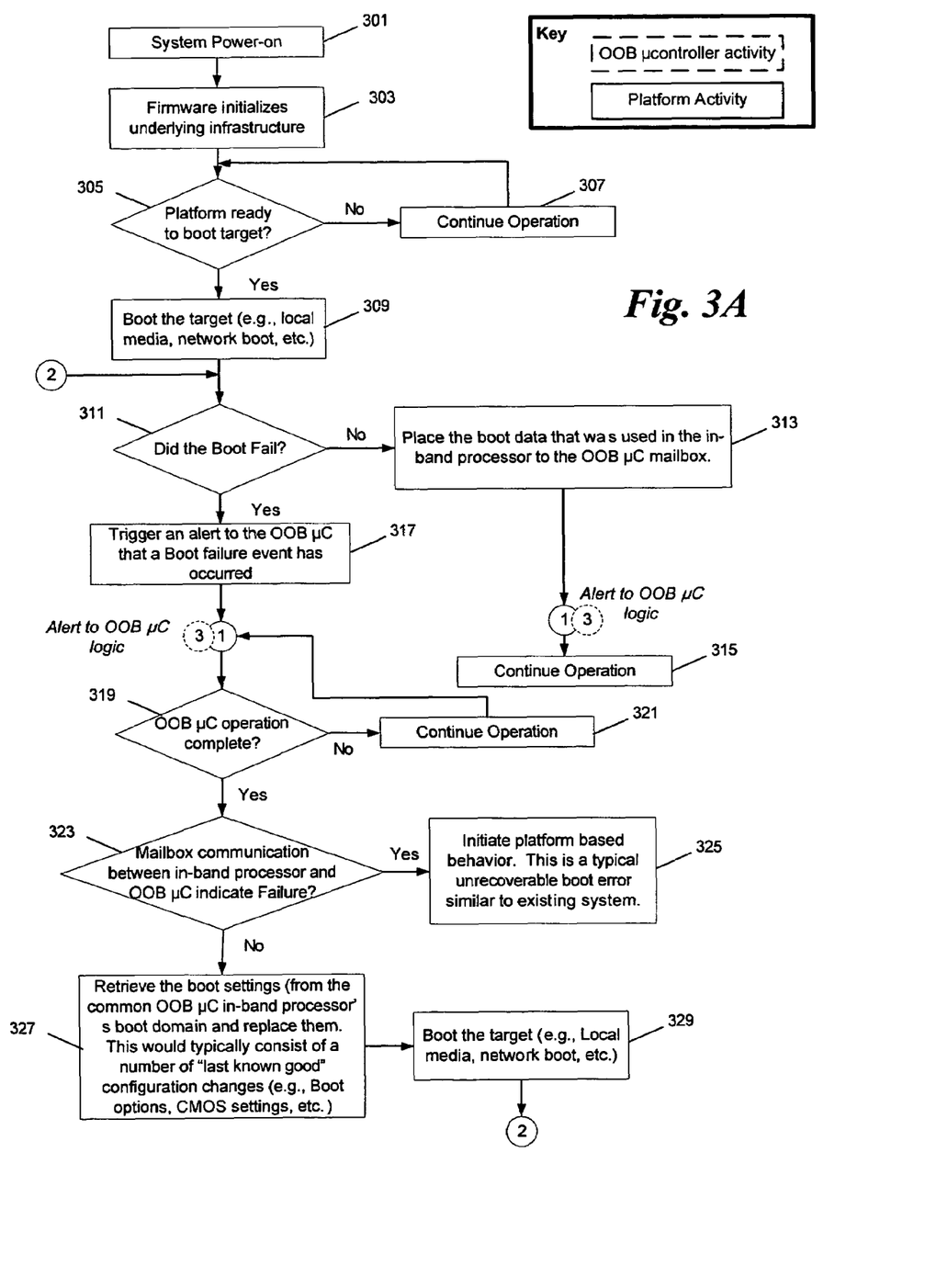
FIGS. 3A and 3B are flow diagrams illustrating a method for autonomic boot recovery, according to an embodiment of the invention.
Figure 3B:
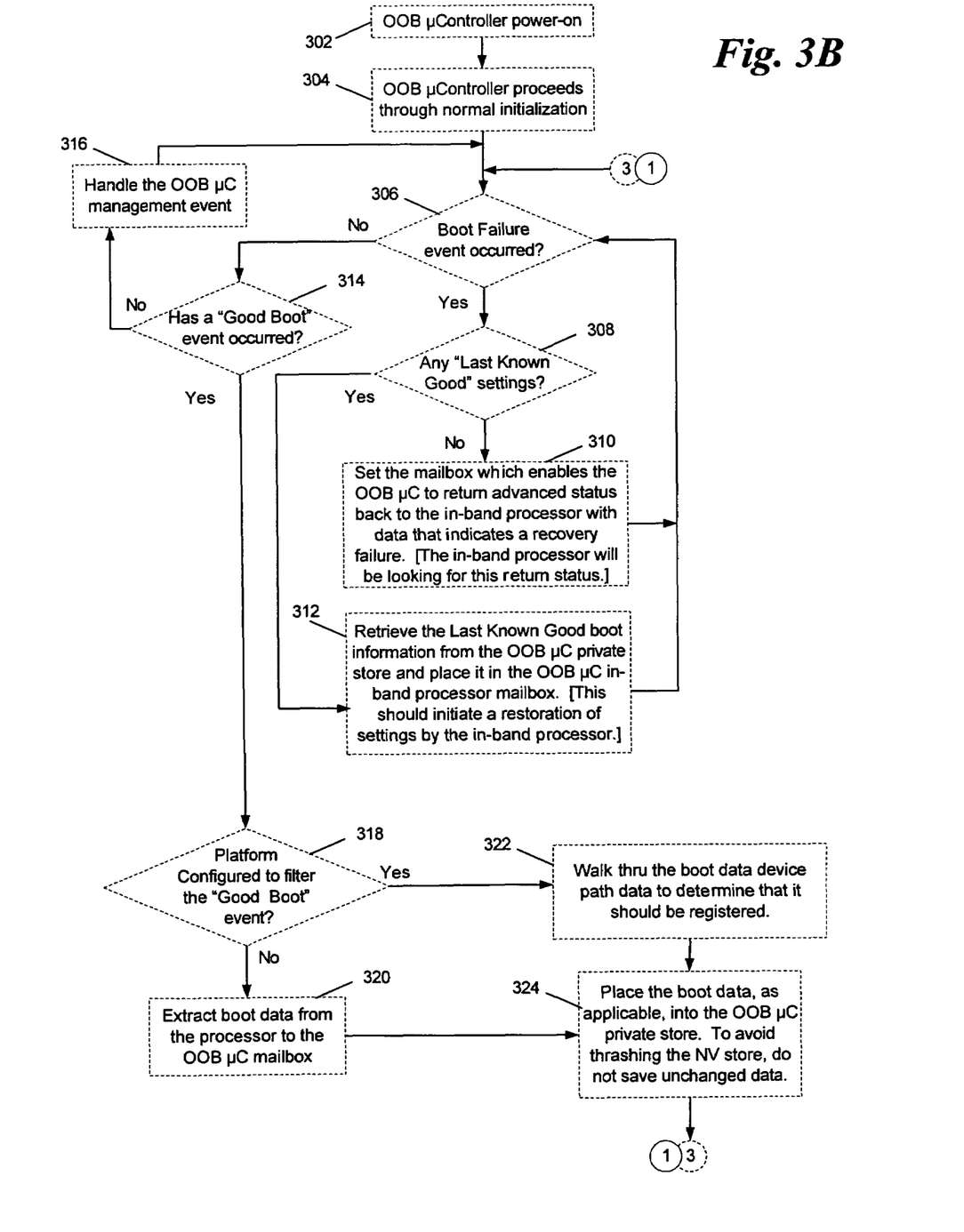

FIGS. 3A and 3B comprise a flow diagram illustrating an exemplary method for autonomous boot recovery, according to embodiments of the invention. It should be noted that activities of both the in-band processor (201) and OOB μcontroller (110n) are shown. Because more than one processor is present, some of the activities may occur in parallel. It should also be noted that for simplicity, the second processor is characterized as an out-of-band microcontroller (OOB μcontroller). In some embodiments, this microcontroller may not have a built-in network interface, and thus not have out-of-band capabilities. The lack of out-of-band capabilities does not affect the ability of the disclosed system and method to operate as an autonomic boot recovery. FIG. 3A shows activities performed by the in-band processor, or firmware (solid blocks), and FIG. 3B shows activities performed by the OOB μcontroller (blocks with broken lines).

Referring now to FIG. 3A, in 301 the platform is powered on. The firmware performs initialization of the underlying platform infrastructure in 303. A determination is made as to whether the platform is ready to boot from the target in 305. The target is defined by the boot vector and boot order. If the platform is not ready to boot, for instance, if all of the drives have not fully spun up, then operations continue in 307 until the platform is ready to boot from target. If the platform is ready to boot, then, the platform is booted from the target identified by the boot vector in 309. The platform may be booted from local media or from a network.

A determination is made as to whether the boot succeeds or fails in 311. A successful boot may be determined in at least two ways. First, an optional platform driver may be bundled with the platform and run under the OS. The platform driver may announce a "Good Boot" signal once the platform has successfully booted. Second, during the platform re-boot, a determination can be made that a successful boot had occurred and a Good Boot can be signaled. In one embodiment, a watchdog timer is set in the OS context. The watchdog timer may set a system management interrupt (SMI) to exit to firmware execution on a periodic basis. The system firmware determines that the system is healthy and if so, sends a good boot signal (flag, variable, CMOS setting, etc.) Firmware may check the presence of this flag at boot.

If the platform has booted successfully, then the valid boot data is communicated to the OOB μcontroller (110n) mailbox from the in-band processor (201) in 313. In an embodiment, mailboxes as described above are used to communicate the appropriate boot data. Other methods of communication may be used. The OOB μcontroller is alerted that a successful boot has occurred. The alert may be a direct communication through a general purpose I/O register (GPIO) or the OOB μcontroller may poll a shared mailbox looking for alerts and information. The platform firmware continues with normal operation at 315 under control of the OS. The OOB μcontroller activities continue at 306.

If the platform boot failed, then the OOB μcontroller is alerted that a boot failure event has occurred in 317. The firmware waits until the OOB μcontroller has had an opportunity to correct the error by replacing the boot vectors with known good values. The firmware loops through 319 and 321 until the OOB μcontroller operation is complete. Once the OOB μcontroller recovery attempt is complete, the firmware reads the mailbox communication from the OOB μcontroller in 323 and determines whether the OOB μcontroller indicates a failure. If there is a failure indication, then the OOB μcontroller was unable to recover the boot process. The firmware then initiates platform-based recovery behavior in 325. This behavior is similar to typical unrecoverable boot errors in existing systems.

If the mailbox communication with the OOB μcontroller indicates successful recovery, then the firmware retrieves the valid boot settings from the mailbox and replaces the boot settings in the BIOS portion of then NV memory (flash) in 327. The platform then boots from the appropriate target in 329. The platform continues operation at 311 to determine whether this boot succeeded or failed.

Referring now to FIG. 3B, when the platform is powered on, the OOB μcontroller is powered on in 302. The OOB μcontroller then proceeds normally through initialization in 304. The OOB μcontroller is similar to the in-band processor with respect to initialization. Initialization may include identifying subcomponents, i.e., RAM and ROM (213), cache memory (215), etc. When the OOB μcontroller received an alert, it is determined whether a boot failure has occurred in 306. If not, then it is determined whether a "good boot" event has occurred in 314. If so, then the OOB μcontroller determines whether the platform is configured to filter certain good boot events in 318, for instance, to save space on the flash memory. If the platform is not configured to filter good boot records, then the good boot data is extracted from the firmware and stored in a mailbox in 320. The data may also be stored in the protected portion of flash (221) in 324.

If the platform is configured to filter good boot events, then the boot data device path is traversed to determine whether this good boot should be registered, in 322. Boot variables may contain many possible boot targets. The boot vectors may be names such as Boot000, Boot001, etc. There may be a hundred different boot targets, i.e., floppy, CD, hard drive n, network target, etc. Boot variables are self-describing. Thus, one can determine targets merely based on boot variable. If flash space is limited, the number of boot variables to be registered, i.e., good copies saved, may be filtered. For example, the administrator may only want to register successful boot data that was engendered by a boot from non-removable media. Filtering is a method for selecting specific boot variables that are of interest, for instance, network targets are to be saved, but not floppy or hard drive targets. The filter identifies which boot targets need to be registered.

The boot data is then placed in the private OOB μcontroller store (221), as applicable in 324. To avoid unnecessary accesses to the OOB μcontroller non-volatile store, unchanged data may not be stored over identical data.

If a boot failure occurred, as determined in 306, then it is determined whether there are any known good settings saved in 308. If no good settings have been saved, then a failure indication is written to the in-band mailbox in 310. The in-band processor looks for this notification in 323. The OOB μcontroller then proceeds to wait for another event in 306.

If there are last known good settings, then the good boot settings are retrieved from the OOB μcontroller private store (221) and placed in the in-band processor mailbox in 312. This initiates restoration of settings by the in-band processor, which continues at the decision block 319. The OOB μcontroller proceeds to 306 to wait for additional boot events.

If neither a boot failure event, nor a good event has occurred, as determined in 306 and 314, respectively, then another type of OOB μcontroller management event is to be handled in 316. Possible events may include a query for thermal information regarding the processor temperature; in-band platform power state information request; or a directive to redirect IDE traffic to a remote device or alternate location. Once completed, the OOB μcontroller again determines whether a boot failure event has occurred in 306.

Although the foregoing operations have been described as a sequential process, some of the operations described in FIGS. 3A and 3B may in fact be performed in parallel or concurrently. In addition, in some embodiments the order of the operations may be rearranged without departing from the spirit of the invention.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for autonomic boot recovery in a platform, comprising:
   a platform having a first processor and a second processor;
   the first processor being communicatively coupled to a non-volatile (NV) memory store, the NV memory store to store firmware boot information configured to boot the platform and load an operating system, the first processor having access to a shared storage area for passing messages to and from the second processor; and
   the second processor being communicatively coupled to a protected portion of the non-volatile (NV) memory store, the protected portion of the NV memory store being inaccessible to both a boot firmware and the operating system running on the first processor, the second processor having access to the shared storage area for passing messages to and from the first processor, the second processor to store last known good boot information in the protected portion of the NV memory store, and to initiate recovery of the first processor using the last known good boot information when a boot failure of the first processor is identified.

2. The system as recited in claim 1, wherein the second processor is configured to forward the last known good boot information to the first processor via the shared storage area when a boot failure is identified.

3. The system as recited in claim 1, wherein the second processor is configured to replace the firmware boot information in the NV memory store with the last known good boot information saved in the protected portion of the NV memory store, and notify the first processor via the shared storage area when a boot failure is identified.

4. The system as recited in claim 1, wherein the first processor comprises at least one in-band processor and the second processor comprises an out-of-band processor.

5. The system as recited in claim 4, wherein the out-of-band processor has a built-in network interface.

6. The system as recited in claim 1, wherein the second processor is to replace firmware boot information with last known good boot information, and to notify the first processor of the replacement to initiate a reboot.

7. The system as recited in claim 1, wherein boot information resides on CMOS operatively coupled to the first processor and the second processor is configured to identify last known good boot information from the CMOS.

8. The system as recited in claim 1, wherein the first processor is configured to alert the second processor upon a successful boot.

9. The system as recited in claim 8, wherein the alert is performed by a platform driver running under the OS.

10. The system as recited in claim 8, wherein the alert is identified by processor firmware, wherein processor firmware executes periodically, as determined by a watchdog timer.

11. A method for autonomic boot recovery of a first processor on a platform, comprising:
    a second processor on the platform receiving an indication from the first processor, when the first processor has booted successfully;
    determining, by the second processor, last known good boot settings for the first processor;
    storing, by the second processor, the last known good boot settings in a protected memory store not accessible to the first processor;
    identifying, by the second processor, when the first processor has failed to boot properly; and
    initiating, by the second processor, a reboot of the first processor when the first processor has failed to boot properly, using the last known good boot settings.

12. The method as recited in claim 11, wherein determining the last known good boot settings further comprises performing heuristics on boot settings and saving good boot settings after a successful boot only when dictated by a platform filtering policy.

13. The method as recited in claim 11, wherein initiating a reboot further comprises:
    retrieving, by the second processor, last known good boot settings from the protected memory store;
    placing the last known good boot settings in a memory store accessible to the first processor; and
    notifying the first processor that good boot settings are available.

14. The method as recited in claim 13, wherein placing the last known good boot settings comprises a selected one of (a) the second processor directly replacing current firmware boot settings in boot firmware with the last known good boot settings, the current firmware boot settings having caused the boot failure, and then notifying the first processor of the replacement; or (b) the second processor placing the last known good settings in a shared memory accessible by both the first and second processors, and notifying the first processor of the placement.

15. The method as recited in claim 14, where notification to the first processor is accomplished by posting a message to a mailbox, wherein the first processor polls the mailbox for new messages on a periodic basis.

16. A machine accessible storage medium having instructions stored therein for autonomic boot recovery of a first processor on a platform, that when accessed cause a second processor on the platform to:
    receive an indication when the first processor has booted successfully;

determine last known good boot settings for the first processor;

store the last known good boot settings in a protected memory store not accessible to the first processor;

identify when the first processor has failed to boot properly; and initiate a reboot of the first processor, when the first processor has failed to boot properly, using the last known good boot settings.

17. The machine accessible storage medium as recited in claim 16, wherein determining the last known good boot settings further comprises performing heuristics on firmware boot settings and saving good boot settings after a successful boot only when dictated by platform filtering policy.

18. The machine accessible storage medium as recited in claim 16, wherein initiating a reboot comprises instructions that when accessed cause the second processor to:

retrieve the last known good boot settings from the protected memory store;

place the last known good boot settings in a memory store accessible to the first processor; and notify the first processor that good boot settings are available.

19. The machine accessible storage medium as recited in claim 18, wherein instructions to place the last known good boot settings causes the second processor to perform a selected one of (a) directly replace current firmware boot settings in boot firmware with the last known good boot settings, the current firmware boot settings having caused the boot failure, and then notify the first processor of the replacement; or (b) place the last known good settings in a shared memory accessible by both the first and second processors, and notify the first processor of the placement.

20. The machine accessible storage medium as recited in claim 19, where notification to the first processor is accomplished by posting a message to a mailbox portion of the shared memory, wherein the first processor polls the mailbox for new messages on a periodic basis.

* * * * *